(12) United States Patent
Tomura et al.

(10) Patent No.: US 11,189,393 B2
(45) Date of Patent: *Nov. 30, 2021

(54) CONDUCTIVE COATED COMPOSITE BODY AND METHOD FOR PRODUCING SAME

(71) Applicant: BANDO CHEMICAL INDUSTRIES, LTD., Kobe (JP)

(72) Inventors: Takuya Tomura, Kobe (JP); Yuki Shingai, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 490 days.

This patent is subject to a terminal disclaimer.

(21) Appl. No.: 15/560,809

(22) PCT Filed: Feb. 19, 2016

(86) PCT No.: PCT/JP2016/000884
§ 371 (c)(1),
(2) Date: Sep. 22, 2017

(87) PCT Pub. No.: WO2016/152017
PCT Pub. Date: Sep. 29, 2016

(65) Prior Publication Data
US 2018/0114609 A1    Apr. 26, 2018

(30) Foreign Application Priority Data

Mar. 23, 2015 (JP) .............................. JP2015-060183

(51) Int. Cl.
*H01B 3/30* (2006.01)
*C09D 5/24* (2006.01)
(Continued)

(52) U.S. Cl.
CPC .............. *H01B 3/302* (2013.01); *B32B 15/08* (2013.01); *C09D 1/00* (2013.01); *C09D 5/02* (2013.01);
(Continued)

(58) Field of Classification Search
None
See application file for complete search history.

(56) References Cited

U.S. PATENT DOCUMENTS 4,847,110 A * 7/1989 Nakajima .............. B82Y 15/00
                                                       430/138
5,726,001 A * 3/1998 Eichorst .................. G03C 1/76
                                                       430/501
(Continued)

FOREIGN PATENT DOCUMENTS

JP      63-319135 A    12/1988
JP      10-264500 A    10/1998
(Continued)

OTHER PUBLICATIONS

International Search Report dated May 24, 2016, issued in counterpart application No. PCT/JP2016/000884. (2 pages).

*Primary Examiner* — Vivian Chen
(74) *Attorney, Agent, or Firm* — Westerman, Hattori, Daniels and Adrian, LLP

(57) ABSTRACT

A conductive coated composite body is disclosed which has both good adhesion of a conductive coating film to a base and excellent electrical conductivity of the conductive coating film at the same time even in cases where a glass base or a base having low heat resistance is used; and a method for producing this conductive coated composite body. A conductive coated composite body includes: a base; a resin layer that is formed on at least a part of the base; and a conductive coating film that is formed on at least a part of the resin layer. The conductive coating film is a sintered (Continued)

body of silver fine particles; the main component of the resin layer is a polyurethane resin having an elongation at break of 600% or more; and the polyurethane resin has one of the functional groups represented by —COO—H, —COOR, —COO⁻NH⁺R$_2$ and —COO⁻NH$_4$⁺.

11 Claims, 2 Drawing Sheets

(51) Int. Cl.

| | | |
|---|---|---|
| C09D 175/04 | (2006.01) | |
| H01B 1/22 | (2006.01) | |
| C09D 7/40 | (2018.01) | |
| C09D 5/02 | (2006.01) | |
| B32B 15/08 | (2006.01) | |
| C09D 1/00 | (2006.01) | |
| H01B 5/14 | (2006.01) | |
| C09D 7/61 | (2018.01) | |
| C09D 11/52 | (2014.01) | |
| C08K 3/08 | (2006.01) | |
| C09D 7/63 | (2018.01) | |
| C09D 7/62 | (2018.01) | |
| C09D 7/65 | (2018.01) | |
| C09D 7/20 | (2018.01) | |
| C08K 9/04 | (2006.01) | |
| H01B 5/16 | (2006.01) | |
| H01B 1/20 | (2006.01) | |
| B05D 7/00 | (2006.01) | |
| B05D 5/12 | (2006.01) | |

(52) U.S. Cl.
CPC .................. *C09D 5/24* (2013.01); *C09D 7/40* (2018.01); *C09D 7/61* (2018.01); *C09D 11/52* (2013.01); *C09D 175/04* (2013.01); *H01B 1/22* (2013.01); *H01B 5/14* (2013.01); *B05D 5/12* (2013.01); *B05D 7/50* (2013.01); *B05D 2301/00* (2013.01); *B05D 2401/00* (2013.01); *B05D 2401/10* (2013.01); *B05D 2401/20* (2013.01); *B05D 2401/21* (2013.01); *B05D 2503/00* (2013.01); *B05D 2601/28* (2013.01); *C08K 3/08* (2013.01); *C08K 9/04* (2013.01); *C08K 2003/0806* (2013.01); *C08K 2201/011* (2013.01); *C09D 7/20* (2018.01); *C09D 7/62* (2018.01); *C09D 7/63* (2018.01); *C09D 7/65* (2018.01); *C09D 7/66* (2018.01); *C09D 7/68* (2018.01); *H01B 1/20* (2013.01); *H01B 3/30* (2013.01); *H01B 5/16* (2013.01)

(56) References Cited

U.S. PATENT DOCUMENTS

| | | | | |
|---|---|---|---|---|
| 6,197,366 | B1* | 3/2001 | Takamatsu | C23C 18/08 427/125 |
| 10,427,251 | B2* | 10/2019 | Shingai | B22F 1/0022 |
| 2005/0008861 | A1* | 1/2005 | Yadav | C08K 3/08 428/403 |
| 2005/0282932 | A1* | 12/2005 | Takizawa | C09D 11/326 523/160 |
| 2006/0147533 | A1* | 7/2006 | Balasubramanian | A61K 2300/00 424/486 |
| 2007/0003603 | A1* | 1/2007 | Karandikar | D06M 16/00 424/443 |
| 2007/0207335 | A1* | 9/2007 | Karandikar | H01B 1/02 428/560 |
| 2008/0057233 | A1* | 3/2008 | Harrison | H05K 3/046 428/32.74 |
| 2008/0151027 | A1* | 6/2008 | Held | C09D 11/324 347/100 |
| 2008/0246007 | A1* | 10/2008 | Gellrich | H05K 3/12 252/500 |
| 2008/0251844 | A1* | 10/2008 | Nomoto | H05K 3/207 257/347 |
| 2009/0214766 | A1* | 8/2009 | Magdassi | B82Y 30/00 427/125 |
| 2010/0025639 | A1* | 2/2010 | Ogi | B82Y 30/00 252/514 |
| 2010/0078208 | A1* | 4/2010 | Inoue | H05K 3/246 174/261 |
| 2010/0189901 | A1* | 7/2010 | Chung | B22F 9/24 427/256 |
| 2010/0279083 | A1* | 11/2010 | Trummer | C09C 1/642 428/195.1 |
| 2011/0009542 | A1* | 1/2011 | Gong | C08K 3/08 524/200 |
| 2012/0043510 | A1* | 2/2012 | Kurihara | B05D 5/12 252/514 |
| 2013/0334470 | A1* | 12/2013 | Kurihara | C22C 5/06 252/514 |
| 2014/0346412 | A1* | 11/2014 | Okamoto | H01B 1/22 252/514 |
| 2015/0001452 | A1* | 1/2015 | Kurihara | B22F 1/0074 252/514 |
| 2015/0068907 | A1* | 3/2015 | Fujikawa | C23C 18/1879 205/50 |
| 2015/0206618 | A1* | 7/2015 | Kozu | C09D 7/67 252/514 |
| 2015/0225588 | A1* | 8/2015 | Iguchi | H01B 1/22 106/31.92 |
| 2015/0231698 | A1* | 8/2015 | Kurihara | B22F 1/0018 252/514 |
| 2015/0232709 | A1 | 8/2015 | Matsui et al. | |
| 2015/0344716 | A1* | 12/2015 | Kroell | C09D 11/14 106/31.65 |
| 2016/0062242 | A1* | 3/2016 | Hamaguchi | G03F 7/0046 174/251 |
| 2016/0101486 | A1* | 4/2016 | Endoh | B22F 1/0022 228/115 |
| 2017/0306172 | A1* | 10/2017 | Koduma | C09C 1/62 |
| 2018/0002576 | A1* | 1/2018 | Sasaki | C09J 1/00 |
| 2018/0133847 | A1* | 5/2018 | Matsui | B22F 9/24 |

FOREIGN PATENT DOCUMENTS

| | | |
|---|---|---|
| JP | 2007-177103 A | 7/2007 |
| JP | 2008-23854 A | 2/2008 |
| JP | 2008-149681 A | 7/2008 |
| JP | 2010-165638 A | 7/2010 |
| JP | 2011-93297 A | 5/2011 |
| JP | 2012-162767 A | 8/2012 |
| JP | 2013-60582 A | 4/2013 |
| JP | 2013-142173 A | 7/2013 |
| JP | 5495465 B1 | 5/2014 |
| JP | 2014-196556 A | 10/2014 |

* cited by examiner

CONDUCTIVE COATED COMPOSITE BODY AND METHOD FOR PRODUCING SAME

TECHNICAL FIELD

The present invention relates to an electrically conductive coated composite body having a base and an electrically conductive coating film, which is usable for a wiring of semiconductor integrated circuits, a wiring of printed circuits, a transparent electrode, and a wiring or electrode suitable to organic thin film transistor substrates, and a method for producing the electrically conductive coated composite body.

BACKGROUND ARTS

There has been known a method for forming a desired conductive film pattern prepared by forming a metal thin film on the whole surface of a substrate by sputtering or vapor deposition method, and then etching by photolithography method to remove unnecessary parts. However, the method requires complicated process steps, and an expensive vacuum apparatus.

Therefore, it has been required a method for producing a conductive film pattern easily and cheaply, and recently, there has been proposed a method by using a printing method such as relief printing, intaglio printing, screen printing or inkjet printing. Further, as a more suitable printing method for forming more delicate pattern, there has been proposed a printing method such as reverse-offset printing or micro contact printing, and various inks such as a conductive ink, an insulation ink and a resistance ink which are suitable to those printing methods have been developed. Here an attractive ink is a conductive ink where using a low temperature sintering property of silver fine particles.

For example, in Patent Literature 1 (Japanese Patent Laid-Open Application 2012-162767), there is disclosed a method of manufacturing a coated metal fine particle including: a first step in which an amine mixture containing an alkylamine having 6 or more carbon atoms and an alkylamine having 5 or less carbon atoms is mixed with a metal compound containing a metal atom, thus producing a complex compound containing the metal compound and an amine; and a second step in which metal fine particles are produced by decomposing the complex compound, by heating the complex compound.

The above Patent Literature 1 describes that, in a process of manufacturing coated metal fine particles using a metal amine complex decomposition method, it becomes possible to smoothly generate a complex compound of amines and a metal compound, and it becomes possible to shorten a time required for manufacturing. In addition, since it becomes possible to use a variety of amines depending on the use and the like of the coated metal fine particles, it becomes possible to provide coated metal fine particles that can be smoothly sintered at a temperature of, for example 100° C. or lower, and it becomes possible to form a conductive film and a conductive wire on a poorly heat-resistant plastic substrate such as PET and polypropylene.

Further, in Patent Literature 2 (Japanese Patent Laid-Open Application 2013-142173), there is proposed a method for producing a silver nanoparticle which comprises: preparing an amine mixed liquid that contains an aliphatic hydrocarbon mono-amine (A) having an aliphatic hydrocarbon group and one amino group wherein the aliphatic hydrocarbon group has a total carbon atom of 6 or more, and an aliphatic hydrocarbon mono-amine (B) having an aliphatic hydrocarbon group and one amino group wherein the aliphatic hydrocarbon group has a total carbon atom of 5 or less, and a content of the amine (A) is 5% by mole or more and less than 20% by mole and a content of the amine (B) is more than 80% by mole and 95% by mole or less on the bases of the total moles of the amine (A) and the amine (B); mixing a silver compound and the amine mixed liquid to yield a complex compound containing the silver compound and the amine; and then thermally decomposing the complex compound to form a silver nanoparticle.

The above Patent Literature 2 describes that, when using the amine mixed liquid containing the aliphatic hydrocarbon mono-amine (A) having 6 or more carbon atoms and the aliphatic hydrocarbon mono-amine (B) having 5 or less carbon atoms, appropriate stabilization of the silver nanoparticle can be obtained.

Further, there are various proposals where a conductive base having a conductive layer which is excellent in adhesion to a base, and for example, in Patent Literature 3 (Japanese Patent Laid-Open Application 2008-149681), a translucent conductive base comprises a thinning pattern formed of a conductive metal containing developing silver and a transparent conductive layer on a support, and an easy adhesion layer having a swelling humidity ratio to water of less than 60% between the support and the thinning pattern.

The above Patent Literature 3 describes that, by providing an easy adhesion layer between a support and a thin line pattern layer and controlling the swelling rate of the layer with respect to water to be less than 60%, it is possible to improve durability and adhesiveness The inventors have found that the compatibility between the thin line shape (thinness and width) and the conductivity and the compatibility of the thin line shape (thinness and width) with the translucency can be easily adjusted.

Further, in Patent Literature 4 (Japanese Patent Laid-Open Application 2014-196556), there is disclosed a method of manufacturing a conductive material includes (1) a step of forming a resin layer (B) on an insulating base (A) by applying a resin layer forming composition (b), (2) a step of forming a nonconductive layer (D) on the resin layer (B) obtained in the step (1) by applying a dispersion liquid (C) containing 0.5 mass % or more of the nonconductive layer (c2) which is one or more metal fine particles selected from the group of gold, silver, copper and platinum protected with a compound (c1) having a nitrogen atom, a sulfur atom, a phosphorus atom or an oxygen atom, and (3) a step of forming a conductive layer (E) by electroless plating on the base material having the nonconductive layer (D) obtained in the step (2), in which the resin layer forming composition (b) is a resin layer forming composition containing an urethane resin (b1), a vinyl polymer (b2) and an aqueous medium (b3).

The Patent Literature 4 describes that, since the nonconductive layer containing fine metal particles containing gold, silver, copper, platinum can be easily obtained by forming the resin layer on various insulating base materials by a coating method, and the nonconductive layer shows excellent catalytic activity for electroless plating and has a function as a scaffold for the plating film which induces strong adhesion, it is possible to manufacture a high-performance conductive material, a printed wiring board substrate, and a printed wiring board that can be used in the high density mounting field at a low cost without requiring a vacuum facility.

PRIOR ART LITERATURE

Patent Literature

Patent Literature 1: Japanese Patent Laid-Open Application 2012-162767
Patent Literature 2: Japanese Patent Laid-Open Application 2013-142173
Patent Literature 3: Japanese Patent Laid-Open Application 2008-149681
Patent Literature 4: Japanese Patent Laid-Open Application 2014-196556

SUMMARY OF INVENTION

Problem to be Solved by the Invention

However, when using the silver nanoparticles of the above Patent Literature 1 and Patent Literature 2, though the conductive coating film obtained by sintering at a low temperature has excellent electric conductivity, in case where the conductive coating film is formed on a glass base or a non-heat resistive bases such as PET (Polyethylene terephthalate) and PEN (Ethylene naphthalate), it is difficult to obtain good adhesion to the base.

Further, in the conductive materials described in Patent Literature 3 and Patent Literature 4, though the adhesion of the conductive coating film to the base is good, there is a case that conductivity of the conductive coating film is damaged.

Therefore, the object of the present invention is to provide an electrically conductive coated composite body having a base and an electrically conductive coating film, which has both good adhesion of the conductive coating film to the base and excellent conductivity of the conductive coating film, even if using a poorly heat-resistant base or a glass base, and a method for producing the composite body.

Means for Solving the Problem

As the results of the present inventors' intensive studies to realize the above objects, in order to obtain a conductive coated composite body which has excellent adhesion to the base and exhibits good conductivity to the poorly heat-resistant base or a glass base, the inventors have found that it is very effective that a polyurethane resin which has a specific functional group and has a large elongation at break of the polyurethane resin is formed as an adhesion layer between the base and the conductive coating film, and then the conductive coating film is formed by using a specific silver nanoparticle dispersion, and have completed the present invention.

Means for Solving the Problem

Namely, according to the present invention, there is provided a conductive coated composite body, which comprises
a base,
a resin layer which is formed on at least a part of the base, and
a conductive coating film which is formed on at least a part of the resin layer, wherein
the conductive coating film is formed by fine silver particles,
a main component of the resin layer is a polyurethane resin having an elongation at break of 600% or more, and
the polyurethane resin has any of functional groups selected from —COO—H, —COOR, —COO—NH$^+$R$_2$ and —COO—NH$_4^+$ (each of R and R$_2$ represents independently an alkyl group, a cycloalkyl group, an alkylene group, an oxyalkylene group, an aryl group, an arylalkyl group, a heterocyclic group, an alkoxy group, an alkoxycarbonyl group or an acyl group, which may be linear or branched and substituted or unsubstituted group).

According to the conductive coated composite body of the present invention, since the resin layer acts as the adhesion layer between the base and the conductive coating film, the base and the conductive coating film has good adhesion property. In addition, though detailed reason is not clear, since the polyurethane resin used for the adhesion layer has the above specific properties, the adhesion property between the resin layer and the base, and the adhesion property between the resin layer and the conductive coating film can be improved.

According to the conductive coated composite body of the present invention, further the conductive coating film has good conductivity which is the same level of conductivity as the fine silver particle inherently have, because the conductive coating film is formed by the fine silver particles, and further is sintered by external heating or the like. Though the reason why such good conductivity can be exhibited is not clear, it seems that the good conductivity can be caused from that the main component of the resin layer used as the adhesion layer is the polyurethane resin having an elongation at break of 600% or more.

More specifically, since the adhesion layer has an elongation at break of 600% or more and thus has excellent flexibility and shrinking-expanding property, it is possible to damp the difference of coefficients of thermal expansion between the base and the conductive coating film during the process for sintering the fine silver particles. As a result, it is seemed that the fine silver particles can be sintered smoothly to give the conductive coating film having excellent conductivity.

According to the conductive coated composite body of the present invention, further the polyurethane resin is preferably an aqueous polyurethane resin. The aqueous polyurethane resin has a less odor, and thus it is possible to protect working place from bad circumstance, and to lower environmental loading.

According to the conductive coated composite body of the present invention, further it is preferable that the resin layer is formed by applying the aqueous polyurethane resin which is dissolved in a solvent to the base. Usually, the aqueous polyurethane resin exist in the form that the resin is dispersed in water (emulsion) and a film may be formed by evaporation of a solvent, but, depending to the film forming condition, there is a case that the film may be formed under the influence of emulsion particle size.

In such a case, when forming a thin resin layer, there is a problem that a surface roughness becomes large. To the contrary, when dissolving the aqueous polyurethane resin in a solvent (for example, ethanol, acetone, etc.), emulsion bubbles are broken to form a uniform solution, and thus the film forming properties (particularly, uniformity of thin film) can be improved.

According to the conductive coated composite body of the present invention, further it is preferable that a film thickness of the resin layer is 1 μm or less. When the film thickness of the resin layer is 1 μm or less, it is advantageous in cost, because excess materials are not necessary. In addition, when the film thickness of the resin layer is more than 1 μm, there is a case that a problem caused from the specific property of the resin layer occurs.

Specifically, since the conductive coating film shrinks and expands excessively due to the flexibility of the resin layer, the conductive coating film has defects (disconnection). Further, when the thickness of the resin layer is large, there is a case that transparency becomes bad, that whitening occurs due to moisture absorption, and that yellowing occurs due to heat. Here, when the film thickness of the resin layer is 1 μm or less, it is possible to reduce these affects to the minimum state.

Further, in the conductive coated composite body of the present invention,
the conductive coating film is preferably formed by a fine silver particle dispersion, which comprises
fine silver particles,
a short chain amine having 5 or less carbon atoms and
a highly polar solvent, and
a dispersant having an acid value for dispersing the fine silver particles, wherein a partition coefficient log P of the short chain amine is −1.0 to 1.4.

The aforementioned fine silver particle dispersion is a fine silver particle dispersion having a low temperature sinterability where fine silver particles are dispersed uniformly to various solvents (particularly a high polar solvent), and when forming the conductive coating film by sintering the conductive coated composite body, it is possible to form the conductive coating film having good conductivity at a low temperature.

The amino group in one molecule of the amine has a relatively high polarity and is easy to get an interaction by the hydrogen bond, but the remaining part other than the functional groups has a relatively low polarity. Further, the amino group is easy to exhibit alkaline property. Accordingly, when the amine is localized (attached) to at least a part of the surface of the fine silver particle (in other words, when at least a part of the surface of the fine silver particle is covered), the organic component and the inorganic particle can cause sufficient affinity, and the fine silver particles can be prevented from agglomeration with each other (improve the dispersing property). Namely, since the amine is adsorbed via the functional group on the surface of the fine silver particle in an appropriate strength to block the contact of fine silver particles with each other, the amine contributes the stability of the fine silver particles in the reservation state. In addition, by heating, the amine moves or evaporates from the surface of the fine silver particles, the fusion of the fine silver particles to each other can be accelerated.

Further, when the amine which constitutes the fine silver particle dispersion is the short chain amine having 5 or less carbon atoms, the amine adhered on at least a part of the surface of the fine silver particles can be easily removed by heating to ensure the good low temperature sinterability (for example a sinterability at 100 to 350° C.) of the fine silver particle.

The reason why the partition coefficient log P is set within the range of from −1.0 to 1.4, when the partition coefficient log P is −1.0 or less, since the polarity of the short chain amine is too high to proceed the reduction of the silver, it is difficult to control the yield of the fine silver particle, and when the partition coefficient log P is 1.5 or more, since the polarity of the amine which coordinates with the silver, it is difficult to disperse in the high polar solvent.

The partition coefficient log P means an octanol/water partition coefficient where n-octanol and water are used as the solvents, and a concentration Co in the octanol and a concentration Cw in water are measured, respectively, and then a the partition coefficient is obtained by calculating a common logarithm log P from the concentration ratio P=Co/Cw. Therefore, the partition coefficient log P means one index which represents a possibility whether the fine silver particles can be dispersed in what range of polar solvent. A method for measuring the partition coefficient log P is not particularly limited, and the partition coefficient can be determined by flask shaking method, a high performance chromatography (HPLC), and a calculation by using a quantitative structure activity algorithm, or the like, and values of literature disclosed in the web site of National Center for Biotechnology Information may be used.

Further, the fine silver particle dispersion is characterized by containing a dispersant having an acid value which is added after the synthesis of the fine silver particles (namely, a dispersant having an acid value in order to disperse the fine silver particles). Here, the "dispersant having an acid value" includes all of the dispersants other than dispersants which do not have an amine value and a hydroxyl value as an adsorbing group or a functional group. By using the dispersant, the dispersing stability of the fine silver particles in the solvent can be improved. Here, the acid value of the dispersant is preferably 5 to 200, and further preferably the dispersant has a functional group derived from a phosphoric acid. The reason why the "dispersant having an acid value" is preferable is not exactly clear, the present inventors assume that the dispersant can adsorb in dense manner by not only the adsorption action to the metal but also the interaction with the short chain amine, and as the result, it is possible to exhibit a high dispersing property while maintaining a low temperature sinterability.

When the fine silver particles are dispersed in the highly polar solvent mentioned below, it is generally effective to use a dispersant having a high polarity. For example, though a short chain amine having a smaller log P value may be used, since the short chain amine generally exhibits its reduction property, there is a case that the reaction rate cannot be maintained properly. Specifically, there is a case that the fine silver particles having excellent dispersion property cannot be formed because the reaction rate becomes too high. Therefore, by adding the highly polar dispersant after the synthesis of the fine silver particles, it is possible to enhance only the compatibility to the dispersing medium while maintaining the fine silver particles as they are (surface modification).

It is preferable that, when the acid value of the dispersant is 5 or more, the dispersant begins to adsorb to the metal substance where the amine is coordinated to make the surface basic through acid-basic interaction, and when being 200 or less, since there is not excess amount of adsorption sites so as to be adsorbed in the suitable manner. Further, it is preferable that, when the dispersant has the functional group derived from a phosphoric acid, since phosphorus P and oxygen O pull with each other through a metal M, it is most effective for the adsorption of a metal or a metal compound, and thus, the suitable dispersing property can be obtained by the minimum adsorption amount. Here, the "acid value" is represented by a numeral of mg of potassium hydroxide required for neutralizing an acidic component contained in 1 g of the sample. The acid value can be measured by an indicator method (p-naphtholbenzein indicator) or a potentiometric titration method.

ISO6618-1997: Testing method for neutralization value by the indicator titration method→Corresponding to the indicator titration method (acid value)

ISO6619-1988: Potentiometric titration method (acid value) →Corresponding to the potentiometric titration method (acid value)

The fine silver particle dispersion further may contain a dispersant having an acid value (protective dispersant) as a protective agent added before the synthesis of the fine silver particle. Here, the "protective dispersant" may be the same kind as the aforementioned "dispersant having an acid value" which is added after the synthesis of the fine silver particle.

Further, in the fine silver particle dispersion, various solvent, particularly a high polar solvent can be used as the solvent. The high polar solvent generally means a solvent such as water or an alcohol having a short carbon atom which is not compatible with a low polar solvent such as hexane or toluene, and according to the present invention, more preferable is an alcohol having 1 to 6 carbon atoms. By using the alcohol having 1 to 6 carbon atoms as the high polar solvent, it is possible to avoid a trouble when using the low polar solvent that, for example, the solvent deteriorates an under layer made of a resin at the time when the fine silver particle dispersion is laminated on a resin. Here, it is preferable to use an alkoxyamine as the amine. When using the alkoxyamine as the amine, the fine silver particles can be dispersed well in the high polar solvent.

The particle size of the fine silver particle which constitutes the fine silver particle dispersion is a nanometer size where the lowering of a melting point is caused, desirably 1 to 200 nm, and as occasion demand, particles having a micrometer size may be contained.

The present invention can provide a method for producing a conductive coated composite body, which comprises:

a first step for forming a resin layer by applying an aqueous polyurethane resin which is dissolved in a solvent to at least of a base, a second step for applying a fine silver particle dispersion to at least a part of the resin layer, and a third step for forming a conductive coating film by sintering the fine silver particles contained in the fine silver particle dispersion by external heating, wherein the aqueous polyurethane resin has an elongation at break of 600% or more, and the aqueous polyurethane resin has any of functional groups selected from —COO—H, —COOR, —COO—NH$^+$R$_2$ and —COO—NH$_4^+$ (each of R and R$_2$ represents independently an alkyl group, a cycloalkyl group, an alkylene group, an oxyalkylene group, an aryl group, an arylalkyl group, a heterocyclic group, an alkoxy group, an alkoxycarbonyl group or an acyl group, which may be linear or branched and substituted or unsubstituted group).

When the conductive coating film is formed by application of the fine silver particle dispersion and external heating, the conductive coating film having excellent conductivity can be formed at a low temperature, and thus it is possible to obtain the conductive coated composite body which can exhibit good conductivity in case of a base having a low heat resistance.

According to the method for producing the conductive coated composite body of the present invention, further it is possible to improve the adhesion property between the resin layer and the base, and between the resin layer and the conductive coating film by using the polyurethane resin having the above mentioned specific functional group as the resin layer.

According to the method for producing the conductive coated composite body of the present invention, further it is possible to damp the difference of coefficients of thermal expansion between the base and the conductive coating film in the third step for sintering the fine silver particles, by using the polyurethane resin having an elongation at break of 600% or more as the adhesion layer. As a result, the fine silver particles can be sintered smoothly, and then it is possible to obtain the conductive coating film having excellent conductivity.

According to the method for producing the conductive coated composite body of the present invention, further it is preferable to use the aqueous polyurethane resin as the polyurethane resin. The aqueous polyurethane resin has a less odor, and thus it is possible to protect working place from bad circumstance, and to lower environmental loading.

According to the conductive coated composite body of the present invention, in the first step, the resin layer is formed by applying the aqueous polyurethane resin which is dissolved in a solvent to the base. Usually, the aqueous polyurethane resin exist in the form that the resin is dispersed in water (emulsion) and a film may be formed by evaporation of a solvent, but, depending to the film forming condition, there is a case that the film may be formed under the influence of emulsion particle size.

In such a case, when forming a thin resin film, there is a problem that a surface roughness becomes large. To the contrary, when dissolving the aqueous polyurethane resin in a solvent (for example, ethanol, acetone, etc.), emulsion bubbles are broken to form a uniform solution, and thus the film forming properties (particularly, uniformity of thin film) can be improved.

According to the method for producing a conductive coated composite body of the present invention, it is preferable that the fine silver particle dispersion is a fine silver particle dispersion comprising:

the fine silver particles,
a short chain amine having 5 or less carbon atoms and
a highly polar solvent, and
a dispersant having an acid value for dispersing the fine silver particles, wherein a partition coefficient log P of the short chain amine is −1.0 to 1.4.

As mentioned above, since the aforementioned fine silver particle dispersion is a fine silver particle dispersion having a low temperature sinterability where fine silver particles are dispersed uniformly to various solvents (particularly a high polar solvent), it is easy to apply to the base (second step), and when forming the conductive coating film by sintering the conductive coated composite body (third step), it is possible to form the conductive coating film having good conductivity at a low temperature.

Effect of the Invention

According to the conductive coated composite body and the producing method thereof, it is possible to provide the conductive coated composite body having the base and the conductive coating film, which has both good adhesion of the conductive coating film to the base and the excellent conductivity of the conductive coating film, even if using a poorly heat-resistant base or a glass base, and a producing method thereof.

EMBODIMENTS FOR SOLVING THE PROBLEM

Hereafter, one preferred embodiment of the conductive coated composite body, and the method for producing thereof of the present invention will be explained in detail. Furthermore, in the explanation hereafter, any redundant explanation may be omitted.

(1) Conductive Coated Composite Body

Figure 1:
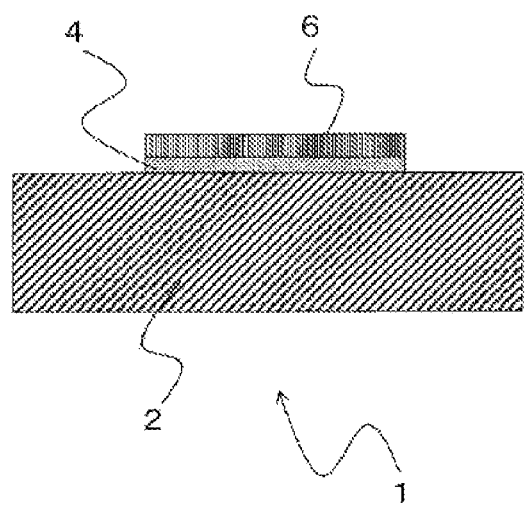
FIG. 1 is a schematic sectional view of the conductive coated composite body according to one embodiment of the present invention.

FIG. 1 shows schematic sectional view of the conductive coated composite body according to the present embodiment. The conductive coated composite body 1 of the present invention includes a base 2, a resin layer 4 which is formed on at least a part of the base 2, and a conductive coating film 6 which is formed on at least a part of the resin layer 4.

Since the resin layer 4 is formed as the adhesion layer between the base 2 and the conductive coating film 6, the conductive coating film 6 and the base 2 have good adhesion property.

(1-1) Conductive Coating Film

The base 2 is not particularly limited as long as being within the scope that will not impair the effects of the present invention, and various conventionally known materials can be used. Examples of materials to constitute the base 2 include a polyester such as polyamide (PA), polyimide (PI), polyamideimide (PAI), polyethylene terephthalate (PET), polybutylene terephthalate (PBT) or polyethylene naphthalate (PEN); polycarbonate (PC), polyether sulfone (PES), a vinyl resin, a fluorine-containing resin, a liquid crystal polymer, a ceramic, a glass, or the like.

(1-2) Resin Layer

A main component of the resin layer 4 is the polyurethane resin having an elongation at break at 600% or more, and the polyurethane resin has any of functional groups selected from —COO—H, —COOR, —COO—NH$^+$R$_2$ and —COO—NH$_4^+$ (each of R and R$_2$ represents independently an alkyl group, a cycloalkyl group, an alkylene group, an oxyalkylene group, an aryl group, an arylalkyl group, a heterocyclic group, an alkoxy group, an alkoxycarbonyl group or an acyl group, which may be linear or branched and substituted or unsubstituted group).

In the conductive coated composite body 1, since the resin layer 4 acts as the adhesion layer between the base 2 and the conductive coating film 6, the base 2 and the conductive coating film 6 has good adhesion property. In addition, though detailed reason is not clear, since the polyurethane resin used for the adhesion layer has the above specific properties, the adhesion property between the resin layer 4 and the base 2, and the adhesion property between the resin layer 4 and the conductive coating film 6 can be improved.

Further, since the polyurethane resin which is a main component of the resin layer 4 has an elongation at break of 600% or more and thus has excellent flexibility and shrinking-expanding property, it is possible to damp the difference of coefficients of thermal expansion between the base 2 and the conductive coating film 6 during the process for sintering the fine silver particles to form the conductive coating film 6. As a result, it is seemed that the fine silver particles can be sintered smoothly to give the conductive coating film 6 having excellent conductivity.

The polyurethane resin is preferably an aqueous polyurethane resin. The aqueous polyurethane resin has a less odor, and thus it is possible to protect working place from bad circumstance, and to lower environmental loading.

Examples of the polyurethane resin include any one of an ester-based, an ether-based, a polycarbonate-based polyurethane resin may be used, and it is preferable to use the ether-base or the polycarbonate-based polyurethane resin which is excellent in hydrolysis resistance.

More specifically, suitable examples of the polyurethane include a SUPERFLEX series: 300, 460, 470, 500M, 740, E-2000, E-4800 available from DKS Co., Ltd., a HYDRAN series: HW312B, HW311, AP-10, AP-70 available from DIC, an urethane emulsion: PERMARINE UA-200, UPRENE UXA-307 available from Sanyo Chemical Co., Ltd., and the like.

Further, since the polyurethane resin used as a main component of the resin layer 4 has the specific functional group, when adding a crosslinking agent which reacts to the functional group, it is possible to control the flexibility of the resin layer 4. Examples of the applicable functional group include an amino group, an isocyanate group, an oxazoline group, a carbodiimide group, and the like. Here, since the reaction of the functional group and the crosslinking agent desirably proceeds during the film formation, it is preferable to use a blocked isocyanate group or the oxazoline group which is difficult to react at room temperature.

However, when adding excess amount of the crosslinking agent, since the specific functional group contained in the polyurethane resin and the crosslinking agent react in the excess manner, the flexibility of the resin layer 4 is damaged. In addition, there is tendency that the adhesion property of the resin layer 4 to the base 2 and the conductive coating film 6 is lowered. Therefore, a solid amount of the crosslinking agent to the solid amount of the polyurethane resin is preferably 10% or less.

The crosslinking agent is not particularly limited as long as being within the scope that will not impair the effects of the present invention, and various conventionally known crosslinking agent can be used, and examples include an Elastron series BN-69, BN-77 available from DKS Co., Ltd., an Epocros series WS-300, WS-500, WS-700 available from NIPPON SHOKUBAI CO., LTD., and the like.

A method for film-forming the resin layer 4 is not particularly limited, there may be used a dipping method, a spraying method, a bar coating method, a spin coating method, a slit die-coating method, an air knife method, a reverse roll coating method, a gravure coating method, a curtain flow method, and the like.

Further, a film forming temperature is not particularly limited, and is a minimum film forming temperature of the composition used for the material of the resin layer 4 or more. Furthermore, occasion demands, the resin layer may be subjected to heat treatment at a temperature of a heat resisting temperature of the base 2 or less.

It is preferable that a film thickness of the resin layer 4 is 1 μm or less. When the film thickness of the resin layer is 1 μm or less, it is advantageous in cost, because excess materials are not necessary. In addition, when the film thickness of the resin layer 4 is more than 1 μm, there is a case that a problem caused from the specific property of the resin layer 4 occurs.

Specifically, since the conductive coating film 6 shrinks and expands excessively due to the flexibility of the resin layer 4, the conductive coating film 6 has defects (disconnection). Further, when the thickness of the resin layer 4 is large, there is a case that transparency becomes bad, that whitening occurs due to moisture absorption, and that yellowing occurs due to heat. Here, when the film thickness of the resin layer 4 is 1 μm or less, it is possible to reduce these affects to the minimum state.

(1-3) Conductive Coating Film

Since the conductive coating film 6 is formed by the fine silver particles and is sintered by external heating, the conductive coating film has good conductivity which is the same level of conductivity as the fine silver particle inherently have.

The fine silver particle dispersion used for forming the conductive coating film 6 is not particularly limited as long as being within the scope that will not impair the effects of the present invention, and various conventionally known fine silver particle dispersions can be used, and it is preferable to use a fine silver particle dispersion, which contains fine silver particles, a short chain amine having 5 or less carbon atoms and a highly polar solvent, and a dispersant having an acid value for dispersing the fine silver particles, wherein a partition coefficient log P of the short chain amine is −1.0 to 1.4.

The aforementioned fine silver particle dispersion is a fine silver particle dispersion having a low temperature sinterability where fine silver particles are dispersed uniformly to various solvents (particularly a high polar solvent), and when forming the conductive coating film 6 by sintering the conductive coated composite body, it is possible to form the conductive coating film 6 having good conductivity at a low temperature.

Further, the short chain amine contained in the fine silver particle and the specific functional group of the polyurethane resin used for a main component of the resin layer 4 interact to exhibit good adhesion property.

(1-3-1) Fine Silver Particle Dispersion

The fine silver particle dispersion of the present embodiment includes the fine silver particles, the short chain amine having 5 or less carbon atoms, and the high polar solvent. In the following, these components are explained.

(A) Fine Silver Particle

An average particle size of the fine silver particles in the fine silver particle dispersion of the present embodiment is not particularly limited as long as being within the scope that will not impair the effects of the present invention, and is preferable to have an average particle size so as to cause lowering of the melting point, and for example, may be 1 to 200 nm. In addition, further preferable is 2 to 100 nm. When the average particle size of the fine silver particles is 1 nm or more, the fine silver particle is endowed with good low temperature sinterability, and it is useful because the cost to manufacture the metal particles will not be high. Further, when being 200 nm or less, the dispersing property of the fine silver particles is not easily changed with lapse of time.

When using the fine silver particle dispersion, considering a problem of migration, a metal where the ionization column is nobler than hydrogen, i.e., gold, copper, platinum and palladium may be added.

The particle size of the fine silver particles in the fine silver particle dispersion of the present embodiment may not be uniform. Further, in case that the fine silver particle dispersion contains a dispersion medium and the like mentioned after as an optional component, though there is a case that metal particle components having an average size of more than 200 nm, the metal particle component having an average particle size of more than 200 nm may be contained, as long as the components do not cause agglomeration or does not remarkably impair the effects of the present invention.

Here, the particle size of the fine silver particles in the fine silver particle dispersion of the present embodiment can be measured by dynamic light scattering, small angle X-ray scattering or a wide-angle X-ray diffraction method. In order to show lowering of the melting point of nanosize fine silver particles, a crystallite diameter that is obtained by the wide-angle X-ray diffraction method is appropriate. For example, in the wide-angle X-ray diffraction method, more specifically, the crystallite diameter can be measured within a range of 30° to 80° of 2θ by the diffraction method, using RINT-Ultima III available from by Rigaku Corporation. In this case, a sample is rolled thinly so as to flatten a surface over a glass plate with approximately 0.1 to 1 mm of recess in the center part. Further, the crystallite diameter (D) that is calculated by assigning a half-value width of the obtained diffraction spectrum to the following Scherrer's equation by using JADE available from Rigaku Corporation is assumed to be the particle size:

$$D = K\lambda/B \cos \theta$$

Herein, K represents Scherrer constant (0.9), λ represents a wavelength of X-ray, B represents a half-value width of diffraction line, and θ represents Bragg angle.

(B) Short Chain Amine Having 5 or Less Carbon Atoms

In the fine silver particle dispersion of the present embodiment, the short chain amine having 5 or less of carbon atoms is attached to at least a part of the surface of the fine silver particle. On the surface of the fine silver particle, there may be adhered a slight amount of organic substances such as a slight amount of an organic substance which is contained initially as organic impurities, a slight amount of an organic substance which is contaminated in the producing processes mentioned after, a residual reducing agent and a residual dispersant which cannot be removed in the washing process.

The short chain amine having 5 or less carbon atoms is not particularly limited as long as the partition coefficient log P is −1.0 to 1.4, and may be linear or branched, and may have a side chain. Examples of the short chain amine include ethylamine (−0.3), propylamine (0.5), butylamine (1.0), N-(3methoxypropyl)propane-1,3-diamine (−0.6), 1,2-ethanediamine, N-(3-methoxypropyl)formamide (−0.2), 2-methoxyethylamine (−0.9), 3-methoxypropylamine (−0.5), 3-ethoxypropylamine (−0.1), 1,4-butanediamine (−0.9), 1,5-pentanediamine (−0.6), pentanolamine (−0.3), aminoisobutanol (−0.8), and the like, and preferable is an alkoxyamine.

The above amine may be a compound containing a functional group other than amine, such as hydroxyl group, carboxyl group, an alkoxy group, carbonyl group, an ester group or mercapto group. Further, the amine may be used alone or in combination of two or more. In addition, it is preferable that a boiling point under normal pressure is preferably 300° C. or less, further preferably 250° C. or less.

The fine silver particle dispersion of the present embodiment may contain a carboxylic acid in addition to the above short chain amine having 5 or less carbon atoms as long as being within the scope that will not impair the effects of the present invention. The carboxyl group in one molecule of the carboxylic acid has a relatively high polarity and is easy to get an interaction by the hydrogen bond, but the remaining part other than the functional groups has a relatively low polarity. Further, the carboxyl group tends to show acidic properties. Furthermore, when the carboxylic acid is localized (attached) to at least a part of the surface of the fine silver particle in the fine silver particle dispersion of the present invention (in other words, when at least a part of the surface of the fine silver particle is covered), the solvent and the fine silver particle can cause sufficient affinity, and the fine silver particles can be prevented from agglomeration with each other (improve the dispersing property).

As the carboxylic acid, a compound having at least one carboxyl group can be widely used, and examples include formic acid, oxalic acid, acetic acid, hexanoic acid, acrylic acid, octylic acid, oleic acid, and the like. A part of the carboxylic acid may form a salt with a metal ion. As the metal ion, two or more metal ions may be contained.

The above carboxylic acid may be a compound containing a functional group other than carboxyl group, such as amino group, hydroxyl group, carboxyl group, an alkoxy group, carbonyl group, an ester group or mercapto group. In this case, it is preferable that the number of the carboxyl group is larger than the number of the functional groups other than the carboxyl group. Further, the carboxylic acid may be used alone or in combination of two or more. In addition, it is preferable that a boiling point under normal temperature is preferably 300° C. or less, further preferably 250° C. or less. The amine and the carboxylic acid form an amide. Since the amide group also appropriately be adsorbed on the surface of the fine silver particle, the amide group may be adhered on the surface of the fine silver particle.

When a colloid is formed by the fine silver particles and the organic substances (such as the above short chain amine having 5 or less carbon atoms) adhered on the surface of the fine silver particle, it is preferable that a content of the organic components in the colloid is 0.5 to 50% by mass. When the content of the organic components id 0.5% by mass or more, the preservation stability of the obtained fine silver particle dispersion tends to be improved, and when 50% by mass or less, the conductivity of the sintered article obtained by heating the fine silver particle dispersion tends to be good. More preferable content of the organic components is 1 to 30% by mass, and further preferable content is 2 to 15% by mass.

(C) High Polar Solvent

The fine silver particle dispersion of the present embodiment is that the fine silver particles are dispersed in various high polar solvent.

As the solvent, there can be used various high polar solvents as long as being within the scope that will not impair the effects of the present invention. Examples of the high polar solvent include methanol, ethanol, propanol, isopropanol, butanol, isobutanol, 2-butanol, pentanol, hexanol, isoamyl alcohol, furfuryl alcohol, nitromethane, acetonitrile, pyridine, acetone cresol, dimethylformamide, dioxane, ethylene glycol, glycerol, phenol, p-cresol, propyl acetate, isopropyl acetate, tert-butanol, 1-pentanol, 2-pentanol, 4-methyl-2-pentanol, 3-methyl-1-pentanol, 3-methyl-2-pentanol, 2-butanol, 1-hexanol, 2-hexanol, 2-pentanone, 2-heptanone, 2-(2-ethoxyethoxy)ethyl acetate, 2-butoxyethyl acetate, 2-(2-butoxyethoxy)ethyl acetate, 2-methoxyethyl acetate, 2-hexyloxyethanol, and the like. According to the present invention, the alcohol having 1 to 6 carbon atoms is preferably used because of good affinity with the short chain amine having 5 or less carbon atoms. Further, the solvent may be used alone or in combination of two or more.

(D) Dispersant

The fine silver particle dispersion of the present embodiment further contains the "dispersant having an acid value" which is added after the synthesis of the fine silver particles in order to disperse the fine silver particles. By using the dispersant, the dispersing stability of the fine silver particles in the solvent can be improved. Here, the acid value of the dispersant is preferably 5 to 200, and further preferably the dispersant has a functional group derived from a phosphoric acid.

When the acid value of the dispersant is 5 or more, the dispersant begins to adsorb to the metal substance where the amine is coordinated to make the surface basic through acid-basic interaction, and when being 200 or less, since there is not excess amount of adsorption sites so as to be adsorbed in the suitable manner. Further, when the dispersant has the functional group derived from a phosphoric acid, since phosphor P and oxygen O pull with each other through a metal M, it is most effective for the adsorption of a metal or a metal compound, and thus, the suitable dispersing property can be obtained by the minimum adsorption amount.

Examples of the polymer dispersant having an acid value of 5 to 200 include a SOLSPERSE series available from The Lubrizol Corporation such as SOLSPERSE-16000, 21000, 41000, 41090, 43000, 44000, 46000 or 54000; a DISPERBYK series available from BYK Japan KK such as DISPERBYK-102, 110, 111, 170, 190, 194N, 2015, 2090 or 2096; a TEGO Dispers series available from Evonik Industries AG such as 610, 610S, 630, 651, 655, 750 W or 755 W, a DISPARLON series available from Kusumoto Chemicals, Ltd. such as DA-375 or DA-1200; Flowlen series available from KYOEISHA CHEMICAL Co., Ltd. such as WK-13E, G-700, G-900, GW-1500, GW-1640 or WK-13E.

The content of the dispersant when adding to the fine silver particle dispersion of the present embodiment may be adjusted depending to desired properties such as a viscosity, and incase that the fine silver particle dispersion is used as a silver ink, the content of the dispersant is preferably 0.5 to 20% by mass, and when using as a silver paste, the content of the dispersant is preferably 0.1 to 10% by mass.

It is preferable that the content of the polymer dispersant is 0.1 to 15% by mass. When the content of the polymer dispersant is 0.1% by mass or more, the dispersing stability of the obtained fine silver particle dispersion is improved, and when the content is too large, the low temperature sinterability becomes lowered. From these points of view, more preferable content of the polymer dispersant is 0.3 to 10% by mass, further preferably 0.5 to 8% by mass.

For the dispersion of the present embodiment, it is further preferable that the weight loss at the time of heating from room temperature to 200° C. according to the thermal analysis is 20% by mass or less, and the weight loss at the time of heating from 200° C. to 500° C. is 10% by mass or less. Here, the weight loss at the time of heating up to 200° C. shows the content of the short chain amine if a low temperature component that mainly contributes to the low temperature sinterability, and the weight loss of the high temperature component between 200 and 500° C. shows the content of the dispersant having an acid value that mainly contributes to the dispersing stability. When the short chain amine and the high temperature component is too large, the low temperature sinterability is impaired. Namely, when the weight loss at the time of heating from room temperature to 200° C. is 20% by mass or less, and the weight loss at the time of heating from 200 to 500° C. is 10% by mass or less, the low temperature sinterability is more superior.

(E) Protective Agent (Protective Dispersant)

The fine silver particle dispersion of the present embodiment further may contain a dispersant having an acid value (protective dispersant) as a protective agent added before the synthesis of the fine silver particle. Here, the "protective dispersant" may be the same kind as or different kind from the aforementioned "dispersant having an acid value" which is added after the synthesis of the fine silver particle.

(F) Other Components

Any components such as an oligomer component that fulfills a role, for example, as a binder, a resin component, an organic solvent (a part of solid components may be dissolved or dispersed), a surfactant, a thickener or a regulator of surface tension can be added to the fine silver particle dispersion of the present embodiment, in order to add functions such as moderate viscosity, adhesiveness, drying characteristic or printability according to the intended use, within the scope that will not impair the effects of the present invention. Such optional components are not particularly limited.

Examples of the resin component include a polyester-based resin, a polyurethane-based resin such as blocked isocyanate, a polyacrylate-based resin, a polyacrylamide-based resin, a polyether-based resin, a melamine-based resin, and a terpene-based resin, and these may be used alone or in combination of two or more.

Examples of the thickener include a clay minerals such as clay, bentonite or hectorite; an emulsion such as a polyester-based emulsion resin, an acrylic-based emulsion resin, a polyurethane-based emulsion resin or blocked isocyanate; cellulose derivatives such as methylcellulose, carboxymethylcellulose, hydroxyethyl cellulose, hydroxypropylcellulose or hydroxypropyl methylcellulose; a polysaccharide such as xanthane gum or guar gum, and the like are exemplified, and these may be used alone or in combination of two or more.

A surfactant which is different from the aforementioned surfactant may be added. In a multi-component solvent-series inorganic colloidal dispersion liquid, roughness on a coating surface and a bias of solid content easily occur due to a difference in a rate of volatilization upon drying. Addition of a surfactant to the fine silver particle dispersion of the present embodiment enables to suppress these disadvantages and to obtain the fine silver particle dispersion that can form a uniform conductive coating.

The surfactant that is usable in the present embodiment is not particularly limited, and any of anionic surfactants, cationic surfactants, and nonionic surfactants are usable, and, for example, alkyl benzene sulfonate, quaternary ammonium salt and the like are exemplified. Among them, since effects can be obtained with a small amount, a fluorine-contain surfactant and a silicone-containing surfactant are preferable.

(1-3-2) Fine Silver Particle

The fine silver particle which contained in the fine silver particle dispersion of the present embodiment is the fine silver particle where an alkoxyamine having 5 or less carbon atoms and a partition coefficient log P of −1.0 to 1.4 adheres on at least a part of the fine silver particle.

When adhering the alkoxyamine having 5 or less carbon atoms and a partition coefficient log P of −1.0 to 1.4 adheres on at least a part of the fine silver particle, it is possible to endow the excellent dispersing property to various solvents (particularly to the high polar solvent) and the low temperature sinterability with the fine silver particle.

As the above solvents, various solvent can be used within the scope that will not impair the effects of the present invention, and it is possible to use a solvent having a SP value (solubility parameter) of 7.0 to 15.0. Here, since one of the features of the fine silver particle dispersion of the present invention is that the fine silver particles are uniformly dispersed even in the high polar solvent, according to the present invention, the alcohol having 1 to 6 carbon atoms is preferably used because of good affinity with the short chain amine having 5 or less carbon atoms. Further, the solvent may be used alone or in combination of two or more.

Examples of the solvent having the SP value (solubility parameter) of 7.0 to 15.0 include hexane (7.2), triethylamine (7.3), ethyl ether (7.7), n-octane (7.8), cyclohexane (8.3), n-amyl acetate (8.3), isobutyl acetate (8.3), methyl isopropyl ketone (8.4), amylbenzene (8.5), butyl acetate (8.5), carbon tetrachloride (8.6), ethylbenzene (8.7), p-xylene (8.8), toluene (8.9), methyl propyl ketone (8.9), ethyl acetate (8.9), tetrahydrofuran (9.2), methyl ethyl ketone (9.3), chloroform (9.4), acetone (9.8), dioxane (10.1), pyridine (10.8), isobutanol (11.0), n-butanol (11.1), nitroethane (11.1), isopropyl alcohol (11.2), m-cresol (11.4), acetonitrile (11.9), n-propanol (12.1), furfuryl alcohol (12.5), nitromethane (12.7), ethanol (12.8), cresol (13.3), ethylene glycol (14.2), methanol (14.8), phenol, p-cresol, propyl acetate, isopropyl acetate, tert-butanol, 1-pentanol, 2-pentanol, 4-methyl-2-pentanol, 3-methyl-1-pentanol, 3-methyl-2-pentanol, 2-butanol, 1-hexanol, 2-hexanol, 2-pentanone, 2-heptanone, 2-(2-ethoxyethoxy)ethyl acetate, 2-butoxyethyl acetate, 2-(2-butoxyethoxy)ethyl acetate, 2-methoxyethyl acetate, 2-hexyloxyethanol, and the like.

The suitable particle size of the fine silver particle of the present embodiment is a nanometer size where the lowering of a melting point is caused, desirably 1 to 200 nm, and as occasion demand, particles having a micrometer size may be contained.

Though the conductive coating film 6 may be formed by using the above fine silver particle dispersion as it is, when preparing a conductive ink which is suitable to transferring printing, it is possible to form the transfer-printed conductive coating film 6 on the resin layer 4. In the following, the conductive ink is explained.

The conductive ink for transferring printing according to the present embodiment is characterized by containing metal particles, a solvent including ethanol, and 0.1 to 3.0% by mass of a high boiling point solvent having a hydroxyl group. Further, the conductive ink contains solid components which contain a metal particle dispersion containing metal particles and an organic component (in other words, metal colloidal particle) as a main component, and a dispersing medium which disperses the solid components. In the above colloidal liquid, the "dispersing medium" may dissolve a part of the solid components.

According to this metal colloidal liquid, since it contains the organic components, the dispersibility of the metal colloidal particles in the metal colloidal liquid can be improved, and thus, even when the content of the metal component in the metal colloidal liquid is increased, the metal colloidal particles are difficult to be agglomerated, and it is possible to maintain good dispersion stability. Here, the "dispersibility" means that, just after preparing the metal colloidal liquid, whether the dispersion state of the metal particles in the metal colloidal liquid is excellent or not (uniform or not), and the "dispersion stability" means that, after lapse of a certain time from the preparation of the metal colloidal liquid, whether the dispersion state of the metal particles in the metal colloidal liquid can be maintained or not, and is so called as "low precipitation and agglomeration property".

Here, in the above metal colloidal liquid, the "organic components" in the metal colloidal particles means organic materials which substantially constitute the metal colloidal particles together with the metal component. The organic components do not include organic materials which adhere to the metal component in a very small amount such as a very small amount of organic materials which are contained initially in the metal as impurities, organic materials derived from a very small amount of organic materials which are mixed during the producing process mentioned after and adhere to the metal component, and a remaining reducing agent and remaining dispersing agent which cannot be removed in the washing step. The "small amount" means specifically less than 1% by mass in the metal colloidal particle.

The metal colloidal particle in the present embodiment has high dispersion stability in the metal colloidal liquid because the organic components are contained. Therefore, even when the content of the metal component in the metal colloidal liquid is increased, the metal colloidal particles are difficult to be agglomerated, and it is possible to maintain good dispersibility.

Further, the "solid component" of the metal colloidal liquid in the present embodiment means solid components which remain after removing the dispersing medium by using a silica gel or the like, and then, for example drying at a temperature of 30° C. or less such as normal temperature (for example 25° C.) for 24 hours, and contains the metal particles, the remaining organic components and the remaining reducing agent, and the like. A method for removing the dispersing medium from the metal colloidal liquid by using the silica gel can be achieved in various ways, and there is employed, for example, a method where the metal colloidal liquid is applied on a glass substrate and then the glass substrate with the coating film is allowed to stay in a sealed container where the silica gel is entered for 24 hours or more to remove the dispersing medium.

According to the metal colloidal liquid of the present embodiment, preferable amount of the solid content is 1 to 60% by mass. When the amount of the solid component is 1% by mass or more, it is possible to ensure a necessary metal content in the conductive ink for transferring printing, and thus the conductive efficiency is not lowered. When the amount of the solid component is 60% by mass or less, a viscosity of the metal colloidal liquid is not increased to make handling of the liquid easy and to be industrially advantageous, and it is possible to form a flat thin film. More preferable amount of the solid component is 5 to 40% by mass.

The conductive ink for transferring printing is characterized by containing the solvent including 0.1 to 3.0% by mass of a high boiling point solvent having a hydroxyl group. It is preferable that the high boiling point solvent having a hydroxyl group is selected from 1,3-butanediol (boiling point: 203° C.), 2,4-diethyl-1,5-pentanediol (boiling point: 150° C./5 mmHg, 200° C. or more at one atomic pressure), or octanediol (boiling point: 243° C.).

The high boiling point solvent means a solvent having a boiling point of 200° C. or more. Further, since, when the hydroxyl group is contained, the solvent has proper affinity to water, and there is tendency that water in air is absorbed or adsorbed to increase moisture, it is possible to prepare a suitable ink for transferring printing by adding a small amount. Furthermore, when making the addition amount of the high boiling point solvent in the minimum amount, it is possible to semi-dry the ink applied on a silicone blanket within a short time, which results in obtaining an effect to shorten the printing cycle.

The addition amount of the high boiling point solvent having a hydroxyl group is 0.1 to 3.0% by mass. When less than 0.1% by mass, it is difficult to prepare a suitable ink for transferring printing because of too small amount, and when more than 3.0% by mass, there is a disadvantage from the viewpoint of printing cycle because it takes a longer time to reach the semi-drying state being suitable to the transferring printing method. The addition amount of the high boiling point solvent having a hydroxyl group is particularly preferably 0.3 to 2.0% by mass, because an ink having a suitable state for the transferring printing method can be more exactly prepared, and there is an advantage from the viewpoint of printing cycle that it takes a shorter time to reach the semi-drying state being suitable to the transferring printing method.

Further, in the conductive ink for transferring printing, a highly volatile solvent such as ethanol is added in order to enhance the drying property of the ink. When adding the solvent, it is possible to regulate a viscosity of the conductive ink for transferring printing to a suitable viscosity rapidly. The highly volatile solvent to be used may be one or more low boiling point solvent selected from the group consisting of solvents having a boiling point of less than 100° C. such as ethanol, methanol, propyl alcohol, isopropyl alcohol, acetone, n-butanol, sec-butanol and tert-butanol.

Furthermore, in the conductive ink for transferring printing, it is preferable to contain a fluorine-based solvent such as a hydrofluoro ether. The fluorine-based solvent can give good wettability to the silicone blanket because of its low surface tension, and also give good drying property because of its relatively low boiling point. Among them, from the viewpoint of ozone depleting potential, the hydrofluoro ether is more preferable than a fluorine-based solvent having a halogen atom.

In addition, since the hydrofluoro ether has an ether bond in comparison with hydrofluorocarbons, the ether gives a high polarity and has an advantage that the ether does not almost swell the silicone blanket, and further the ether has effects such as good compatibility with an alcohol such as ethanol, and also good compatibility with the metal particles dispersed in the alcohol, the hydrofluoro ether is more preferable.

In the conductive ink for transferring printing, a fluorine-based surfactant which contains a fluorine atom may be added in order to improve the wettability to the silicone blanket. In this case, since when the addition amount is too large, the conductive coating film formed by using the conductive ink for transferring printing becomes lowered, and when the amount is too small, the effect to improve the wettability is insufficient, suitable is 0.01 to 2% by mass.

In the conductive ink for transferring printing, a surface tension is 22 mN/m or less. When the surface tension is lowered sufficiently to 22 mN/m or less, it is ensured sufficiently to give the wettability of the conductive ink for transferring printing to the silicone blanket. By regulating a ratio of the components of the conductive ink for transferring printing of the present invention, it can be realized to lower the surface tension to 22 mN/m or less. The lower limit of the surface tension may be around 13 mN/m. The surface tension in the present invention is a value obtained by measuring a principal so-called the plate method (Wilhelmy method), and can be measured, for example, by using a full automatic surface tension balance CBVP-Z available from Kyowa Interface Science Co., LTD. and the like.

(1-3-3) Method for Producing Fine Silver Particle and Fine Silver Particle Dispersion The method for producing the fine silver particle and the fine silver particle dispersion of the present embodiment includes a step for preparing fine silver particle and a step for adding and mixing the dispersant having an acid value to the fine silver particle in order to disperse the fine silver particle, and further includes a first pre-step for preparing a mixed liquid of a silver compound which is decomposed by reduction to produce a metal silver, and a short chain amine having a partition coefficient log P of −1.0 to 1.4, and a second pre-step for reducing the silver compound in the mixed liquid to produce a fine silver particle where a short chain amine having 5 or less carbon atoms which is adhered to at least a part of the surface of the particle.

In the first pre-step, it is preferable that the short chain amine is added in an amount of 2 mol or more relative to 1 mol of the metal silver. When the short chain amine is added in an amount of 2 mol or more relative to 1 mol of the metal silver, the short chain amine can be adhered in an appropriate amount on the surface of the fine silver particle obtained by the reduction, and thus the fine silver particle can be endowed with the excellent dispersing property with respect to various solvents (particularly the high polar solvent) and the low temperature sinterability.

By controlling the formulations of the mixed liquid in the first pre-step and the reduction conditions (for example, heating temperature, heating time, etc.) in the second pre-step, it is preferable that the particle size of the fine silver particle is a nanometer size where the melting point is lowered, and more preferably 1 to 200 nm. Here, as occasion demand, particles having a micrometer side may be contained.

Any method for collecting the fine silver particles from the fine silver particle dispersion obtained in the above second pre-step can be employed without limitation, and, for example, there is a method for washing the fine silver particle dispersion, and the like.

As a starting material for obtaining the silver particles coated with an organic substance (short chain amine having a partition coefficient log P of −1.0 to 1.4), various well-known silver compounds (metallic salts or their hydrates) can be used, and examples include a silver salt such as silver nitrate, silver sulfate, silver chloride, silver oxide, silver acetate, silver oxalate, silver formate, silver nitrite, silver chlorate or silver sulfide. These salts are not particularly limited as long as they can be reduced, and the silver salt may be used as being dissolved in an appropriate solvent, or dispersed in a solvent as they are.

Further, a method to reduce these silver compounds in the raw material liquid is not particularly limited, and for example, a method using a reducing agent, a method to irradiate a light such as ultraviolet rays, electron beams, ultrasonic waves or thermal energy, a method to heat, and the like are exemplified. Among them, the method using a reducing agent is preferable from a viewpoint of easy operation.

Examples of the reducing agent include, for example, amine compounds such as dimethylaminoethanol, methyldiethanolamine, triethanolamine, phenidone or hydrazine; for example, hydrogen compounds such as sodium borohydride, iodinated hydrogen or hydrogen gas; for example, oxides such as carbon monoxide or sulfurous acid; for example, low-valent metal salts such as ferrous sulfate, ferric oxide, iron fumarate, ferrous lactate, iron oxalate, ferric sulfide, tin acetate, tin chloride, diphosphate tin, tin oxalate, tin oxide or tin sulfate; for example, sugar such as ethylene glycol, glycerin, formaldehyde, hydroquinone, pyrogallol, tannin, tannic acid, salicylic acid or D-glucose, but the reducing agent is not particularly limited as long as it is dissolved into a dispersion medium and can reduce the above metal salt. In case of using the reducing agent, a reduction reaction can be accelerated by adding a light and/or heat.

As a specific method to prepare silver particles coated with the organic substance by using the metal salt, the organic substance, the dispersion medium and the reducing agent, for example, there is a method where the metal salt is dissolved into an organic solvent (for example, toluene or the like) to prepare a metal salt solution, a short chain amine and a protective dispersant having an acid value is added as the dispersant into the metal salt solution, and next, a solution where the reducing agent has been dissolved is gradually added dropwise into this mixture, and the like.

A counter ion of the metal salt, a residue of the reducing agent and the dispersant other than the fine silver particles exist in a dispersion liquid containing the fine silver particles coated with the short chain amine and the protective dispersant having an acid value obtained as mentioned above, and electrolyte concentration and organic substance concentration of the entire liquid tends to be high. Since the liquid in such condition has high conductivity, and the like, coagulation of the fine silver particles occurs and they are easily precipitated. Alternatively, even if the metal particles are not precipitated, if a counter ion of metal salt, a residue of the reducing agent or a more than necessary amount for dispersion of excess dispersant remains, the conductive property may be deteriorated. Then, the fine silver particles coated with an organic substance can be certainly obtained by washing the solution containing the fine silver particles to remove any excessive residues.

As the washing method, for example, a method to repeat a process where a dispersion liquid containing the fine silver particles coated with the organic component is set stationary for a certain period of time, and after a generated supernatant solution is removed, a solvent to precipitate the fine silver particles (for example, water, methanol, a methanol/water mixed solvent, etc.) is added and the mixture is stirred again, and the mixture is further set stationary for a certain period of time and the generated supernatant solution is removed, several times; a method for centrifugal separation instead of setting stationary; a method for demineralization by an ultrafiltration apparatus or ion-exchange equipment and the like are exemplified. The fine silver particles coated with the "short chain amine and the dispersant having an acid value" of the present embodiment can be obtained by removing excess residues with such washing, and, by removing an organic solvent.

Among the present embodiments, the metal colloidal dispersion liquid is obtained by mixing the fine silver particles coated with the short chain amine and the protective dispersant having an acid value obtained above and the dispersion medium explained in the present embodiments. Such method for mixing the fine silver particles coated with the "short chain amine and the protective dispersant having an acid value" and a dispersion medium is not particularly limited, and it can be conducted with a conventionally well-known method using an agitator or a stirrer. Mixing can be stirred with a spatula, and an ultrasonic homogenizer with appropriate output may be aimed.

When a metal colloidal dispersion liquid containing a plurality of metals is obtained, the producing method is not particularly limited, and for example, if a metal colloidal dispersion liquid made from silver and other metals is manufactured, a dispersion liquid containing fine silver particles and another dispersion liquid containing other metal particles are separately manufactured in the preparation of fine silver particles coated with the organic substance above, and these may be mixed later, and a silver ion solution and other metal ion solution may be mixed and then be reduced.

The fine silver particle may be produced by a method for producing a fine silver particle, which comprises a first step for preparing a mixed liquid of a silver compound which is decomposed by reduction to produce a metal silver, and a short chain amine having a partition coefficient log P of −1.0 to 1.4, and a second step for reducing the silver compound in the mixed liquid to produce a fine silver particle where a short chain amine having 5 or less carbon atoms which is adhered to at least a part of the surface of the particle.

For example, fine silver particles protected with a protective film of the short chain amine can be manufactured by heating a metal compound, such as silver nitrate containing silver, and a complex compound generated from the short chain amine, and by agglomerating atomic silvers that are generated by decomposing a metal compound of oxalate ion contained in the complex compound.

Thus, in the metal amine complex decomposition method for producing fine silver particles coated with amine, because atomic metal is generated by decomposition reaction of a metal amine complex, which is single variety of molecule, it is possible to uniformly generate an atomic metal within a reaction system, and compared to a case of generating a metal atom due to reaction between a plurality of components, unevenness of reaction caused by composition fluctuations of components constituting the reaction is suppressed, and it is advantageous particularly on the occasion of producing a large quantity of fine silver particles on an industrial scale.

Further, in the metal amine complex decomposition method, the short chain amine molecule coordinate-bonds with a metal atom to be generated, and it is seemed that movement of the metal atom on the occasion of generating agglomeration is controlled by a function of the short chain amine molecule coordinated in the metal atom. As a result, according to the metal amine complex decomposition method, it is possible to produce fine silver particles having a narrow particle size distribution.

In addition, many short chain amine molecules generate comparatively weak force of coordinate bond on the surface of fine silver particles to be produced, as well, and because these form a dense protective coating on the surfaces of the fine silver particles, it is possible to produce coated fine silver particles where their surfaces having excellent preservation stability are clean. Further, because the short chain amine molecules forming the coating are easily detachable by heating or the like, it is possible to produce fine silver particles, which are sinterable at a very low temperature.

Further, when generating a composite compound such as a complex compound, by mixing a solid metal compound and an amine, generation of a composite compound such as a complex compound, becomes easy by mixing and using the short chain amine having 5 or less carbon atoms into the dispersant having an acid value constituting a coating comprising coated fine silver particles, and it is possible to produce a composite compound by mixing for a short time. Further, it is possible to produce coated fine silver particles having properties according to various uses by mixing and using the short chain amine.

Thought the dispersant paste of the present embodiment obtained as mentioned above is usable as it is, various inorganic components and organic components can be added within a range not impairing the dispersion stability and the low-temperature sinterability of the conductive ink and the conductive paste.

(2) Method for Producing Conductive Coated Composite Body

Figure 2:
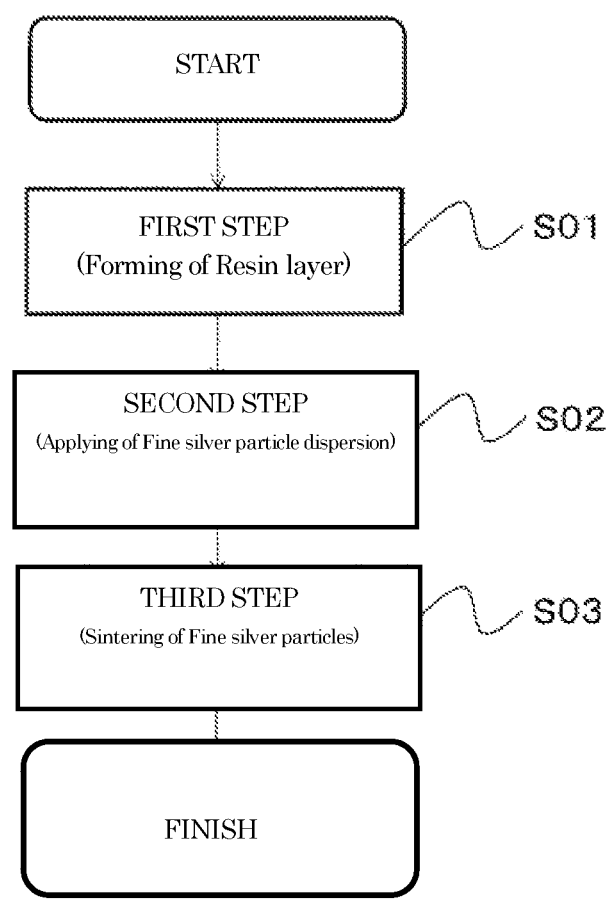
FIG. 2 is a process chart of one embodiment of the producing method of the conductive coated composite body according to one embodiment of the present invention.

FIG. 2 shows a process chart of one embodiment of the producing method of the conductive coated composite body according to one embodiment of the present invention. The producing method for the conductive coated body includes a first step (S01) for forming the resin layer 4 by applying the polyurethane resin to at least a part of the base 2, a second step (S02) for applying the fine silver particle dispersion to at least a part of the resin layer 4, and a third step (S03) for forming the conductive coating film 6 by sintering the fine silver particles contained in the fine silver particle dispersion by external heating.

(2-1) Forming of Resin Layer (First Step (S01))

The first step is a step for forming the resin layer 4 by applying the aqueous polyurethane resin which is dissolved in the solvent to at least a part of the base 2. Here, the polyurethane resin is preferably an aqueous polyurethane resin which is dissolved in the solvent.

When using the aqueous polyurethane resin which has an elongation at break of 600% or more, and has any of functional groups selected from —COO—H, —COOR, —COO—NH$^+$R$_2$ and —COO—NH$_4^+$ (each of R and R$_2$ represents independently an alkyl group, a cycloalkyl group, an alkylene group, an oxyalkylene group, an aryl group, an arylalkyl group, a heterocyclic group, an alkoxy group, an alkoxycarbonyl group or an acyl group, which may be linear or branched and substituted or unsubstituted group), it is possible to improve the adhesion property between the conductive coating film 6 and the base 2 formed in the second step (S02) and the third step (S03), and also, to form the conductive coating film 6 having excellent conductivity.

For example, the resin layer 4 is formed by applying the aqueous polyurethane resin dissolved in the solvent to the base 2. Usually, the aqueous polyurethane resin exist in the form that the resin is dispersed in water (emulsion) and a film may be formed by evaporation of a solvent, but, depending to the film forming condition, there is a case that the film may be formed under the influence of emulsion particle size, and particularly in case of forming a thin resin layer 4, there is a problem that a surface roughness becomes large. To the contrary, when dissolving the aqueous polyurethane resin in a solvent (for example, ethanol, acetone, etc.), emulsion bubbles are broken to form a uniform solution, and thus the film forming properties (particularly, uniformity of thin film) can be improved, an then the good resin layer 4 can be formed.

Further, when the adhesion layer (resin layer 4) is formed by the polyurethane resin which has an elongation at break of 600% or more, in the third step (S03) where the fine silver particles are sintered, it is possible to damp the difference of coefficients of thermal expansion between the base 2 and the conductive coating film 6. As a result, the fine silver particles can be sintered smoothly to give the conductive coating film 6 having excellent conductivity.

When forming the resin layer 4 on the surface of the base 2, in order to enhance the adhesion property between the base 2 and the resin layer 4, the base 2 may be subjected to surface treatment. Examples of the surface treatment include a dry treatment such as corona treatment, plasma treatment, UV treatment and electron beam treatment, and the like.

A method for film-forming the resin layer 4 is not particularly limited, there may be used a dipping method, a spraying method, a bar coating method, a spin coating method, a slit die-coating method, an air knife method, a reverse roll coating method, a gravure coating method, a curtain flow method, and the like, and also, a film forming temperature is not particularly limited, and is a minimum film forming temperature of the composition used for the material of the resin layer 4 or more. Furthermore, occasion demands, the resin layer may be subjected to heat treatment at a temperature of a heat resisting temperature of the base 2 or less.

(2-2) Applying of Fine Silver Particle Dispersion (Second Step (S02))

The second step is a step for applying the fine silver particle dispersion to the surface of the base 2. The fine silver particle dispersion is not particularly limited as long as being within the scope that will not impair the effects of the present invention, and various conventionally known fine silver particle dispersions can be used, and it is preferable to use a fine silver particle dispersion, which contains fine silver particles, a short chain amine having 5 or less carbon atoms and a highly polar solvent, and a dispersant having an acid value for dispersing the fine silver particles, wherein a partition coefficient log P of the short chain amine is −1.0 to 1.4.

It is possible to employ various methods for applying the fine silver particle dispersion, and to employ appropriately by selecting from, for example, dipping, screen printing, reverse-offset printing, micro contact printing, spraying, bar-coating, spin-coating, inkjet, dispenser, pin transfer method, stamping method, applying with a brush, casting, flexo, gravure, offset method, transfer method, hydrophilic and hydrophobic pattern method, syringe, and the like.

When forming the conductive coating film 6 on the surface of the resin layer 4, in order to enhance the adhesion property between the resin layer 4 and the conductive coating film 6, the resin layer 4 may be subjected to surface treatment. Examples of the surface treatment include a dry treatment such as corona treatment, plasma treatment, UV treatment and electron beam treatment, and the like.

(2-3) Sintering of Fine Silver Particles (Third Step (S03))

The third step is a step for forming the conductive coating film 6 by heating the base 2 where the fine silver particle dispersion is applied in the second step (S02) to sinter the fine silver particles.

When using the fine silver particle dispersion of the present embodiment, after applying to the base 2, it is possible to obtain the conductive coating film 6 by heating and baking at a relatively low temperature (for example, 300° C. or less, preferably 100 to 250° C.) to sinter the fine silver particles. When sintering, the temperature may vary up and down stepwise. Further, the surface where the fine silver particle dispersion is applied can be coated previously with a surfactant or surface active agent.

In the present embodiment, when the fine silver particle dispersion contains a binder component, the binder component may be sintered from a viewpoint of improvement of strength of a coating, and the like, but the binder component can be all removed by controlling baking conditions, in order to adjust a viscosity of the fine silver particle dispersion for applying to various printing methods as principal purposes of the binder component.

The method for heating and baking is not particularly limited, but the conductive dispersion can be sintered by heating and baking so as to cause a temperature of the conductive dispersion applied or drawn on the base 2, for example, at 300° C. or less, using, for example, a conventionally well-known oven, or the like. The lower limit of the temperature for heating and baking is not particularly limited, and it can be a temperature within a scope of not impairing the effects of the present invention. Here, in the conductive coating film 6 after baking, the smaller residual volume of the organic substance is better from a point to obtain higher strength and excellent conductivity as much as possible, but a portion of the organic substance may remain within a scope of not impairing the effects of the present invention.

In the above, the typical embodiments of the present invention are explained by referring Examples and Comparative Examples, but the present invention is not limited to these embodiments, and various changes in design may be possible, those changes may be included within the scope of the present invention.

EXAMPLE

In the following, the conductive coated composite body and the method for producing the body of the present invention are explained in detail by referring Examples and Comparative Examples, but the present invention is never limited to those Examples.

Preparation Example 1

8.9 g of 3-methoxypropylamine (first class grade chemicals manufactured by Wako Pure Chemical Industries, Ltd., number of carbon atoms: 4, log P: −0.5) and 0.3 g of DISPERBYK-111 of a polymer dispersant were mixed and sufficiently stirred with a magnetic stirrer to prepare an amine mixture (molar ratio of the added amine being 10 to the silver). Next, 3.0 g of silver oxalate was added while stirring. After adding the silver oxalate, the silver oxalate was converted to a viscous white substance by continuing the stirring at room temperature, the stirring was finished at the time when the change was terminated in view of appearance.

The thus obtained mixture was transferred to an oil bath, and stirred with heating at 120° C. Just after the stirring, a reaction started with generation of carbon dioxide, and thereafter, the stirring was continued until the generation of the carbon dioxide was terminated to obtain a suspension where the fine silver particles were suspended in the amine mixture.

Next, in order to displace the dispersing medium of the suspension, after adding 10 mL of a mixed solvent of methanol/water and stirring, the fine silver particles were separated by precipitating with a centrifugal treatment, and 10 mL of a mixed solvent of methanol/water was added again, and subjected to stirring and separating with the centrifugal treatment, and then 2.1 g of a mixed solvent of ethanol/isobutanol/IPA (40/40/30 v/v) was added thereto as a dispersing medium to obtain a fine silver particle dispersion A having a solid content of 48 wt %.

Preparation Example 2

8.9 g of 3-methoxypropylamine (first class grade chemicals manufactured by Wako Pure Chemical Industries, Ltd., number of carbon atoms: 4, log P: −0.5) and 0.3 g of DISPERBYK-102 of a polymer dispersant were mixed and sufficiently stirred with a magnetic stirrer to prepare an amine mixture (molar ratio of the added amine being 5 to the silver). Next, 3.0 g of silver oxalate was added while stirring. After adding the silver oxalate, the silver oxalate was converted to a viscous white substance by continuing the stirring at room temperature, the stirring was finished at the time when the change was terminated in view of appearance.

The thus obtained mixture was transferred to an oil bath, and stirred with heating at 120° C. Just after the stirring, a reaction started with generation of carbon dioxide, and thereafter, the stirring was continued until the generation of the carbon dioxide was terminated to obtain a suspension where the fine silver particles were suspended in the amine mixture.

Next, in order to displace the dispersing medium of the suspension, after adding 10 mL of a mixed solvent of methanol/water and stirring, the fine silver particles were separated by precipitating with a centrifugal treatment, and 10 mL of a mixed solvent of methanol/water was added again, and subjected to stirring and separating with the centrifugal treatment, and then 2.1 g of ethanol containing 0.06 g of SOLSPERSE 41000 (available from Lubrizol Japan Corporation) was added thereto as a dispersing medium to obtain a fine silver particle dispersion B having a solid content of 48 wt %.

Preparation Example 3

17 g of trisodium cirtate dihydrate and 0.36 g of tannic acid were dissolved in 50 mL of water where 3 mL of 10N—NaOH aqueous solution was added to be alkaline. To the obtained solution, 3 mL of 3.87 mol/L silver nitrate aqueous solution, and stirred for 2 hours to obtain a silver colloidal aqueous solution. The obtained silver colloidal aqueous solution was desalted by dialyzing until a conductivity was 30 μS/cm or less. After dialysis, concentration was achieved, and the coarse metal colloidal particles were removed by centrifuging under the conditions of 2100 rpm (920 G), 10 minutes to obtain a fine silver particle dispersion C having a solid content of 48 wt %.

Preparation Example 4

200 ml of toluene (first class grade chemicals manufactured by Wako Pure Chemical Industries, Ltd.) and 11 g of butylamine (first class grade chemicals manufactured by Wako Pure Chemical Industries, Ltd., number of carbon atoms: 4, log P: 1.0) were mixed and sufficiently stirred with a magnetic stirrer (molar ratio of the added amine being 2.5 to the silver). While stirring, 10 g of silver nitrate (special grade chemicals manufactured by Toyo Chemical Industrial Co., Ltd.) was added into this mixture, and after the silver nitrate was dissolved, 10 g of DISPERBYK-2090 and 10 g of hexanoic acid (special grade chemicals manufactured by Wako Pure Chemical Industries, Ltd.) were added. A 0.02 g/ml of sodium borohydride solution prepared by adding 1 g of sodium borohydride (manufactured by Wako Pure Chemical Industries, Ltd.) into 50 ml of ion-exchanged water was instilled into this mixture, and a liquid containing silver particles was obtained. After stirring for one hour, 200 ml of methanol (special grade chemicals manufactured by Wako Pure Chemical Industries, Ltd.) was added, and the silver particles were agglomerated and precipitated. In addition, after the silver particles were completely precipitated with centrifugal separation, toluene and methanol, which are supernatants, were removed, further excess organic substances were removed, and then 6 g of 2-pentanol was added to obtain a fine silver particle dispersion D having a solid content of 50 wt %.

The fine silver particle dispersions A to D were mixed with the other components shown in Table 1 to obtain conductive inks A to D. The amounts of the other components are shown in % by mass. In addition, the elongations at break and the like of the resins used as the inks for forming the resin layers are shown in Table 2.

TABLE 1

| | | Conductive ink A | Conductive ink B | Conductive ink C | Conductive ink D |
|---|---|---|---|---|---|
| Fine silver particle dispersion | Fine silver particle dispersion A | 40 | | | |
| | Fine silver particle dispersion B | | 40 | | |
| | Fine silver particle dispersion C | | | 28 | |
| | Fine silver particle dispersion D | | | | 40 |
| Solvent | Ethanol | 48.3 | 38.9 | 40 | |
| | Water | | | 29.5 | |
| | 2-Propanol | | | | 48.9 |
| High boiling point solvent | 1,3-Butylene glycol | 1.5 | 1 | | 1 |
| | Glyceride | | | 2 | |
| Other solvent | Novec 7300 | 10 | 20 | | 10 |
| Surfactant | Surflon S-651 | 0.1 | 0.1 | | 0.1 |
| | Surflon S-386 | | | 0.5 | |

TABLE 2

| Product Name | Kind | Soild content (wt %) | Elongation at break (%) |
|---|---|---|---|
| HYDRAN HW 312B from DIC | Aqueous polyurethane resin, anionic | 40 | 700 |
| HYDRAN HW 311 from DIC | Aqueous polyurethane resin, anionic | 45 | 800 |
| SUPERFLEX 470 from DKS | Aqueous polyurethane resin, anionic | 38 | 640 |
| SUPERFLEX 210 from DKS | Aqueous polyurethane resin, anionic | 35 | 5 |
| SUPERFLEX 420 from DKS | Aqueous polyurethane resin, anionic | 32 | 290 |
| SUPERFLEX 150HS from DKS | Aqueous polyurethane resin, anionic | 38 | 480 |
| SUPERFLEX 500M from DKS | Aqueous polyurethane resin, nonionic | 45 | 1100 |
| SUPERFLEX 650 from DKS | Aqueous polyurethane resin, cationic | 26 | 340 |

TABLE 2-continued

| Product Name | Kind | Soild content (wt %) | Elongation at break (%) |
|---|---|---|---|
| Aronmighty AS-60 from TOAGOSEI | Epoxy Resin | 22 | — |
| Eslec BL-S from SEKISUI Chem. | Polyvinyl-butyral resin | 100 | — |
| Epocros WS-700 from NIPPON SHOKUBAI | Oxazoline-containing polymer | 25 | — |
| HYDRN ADS-120 from DIC | Aqueous polyurethane resin, anionic | 50 | — |

Example 1

HYDRAN HW-312B available from DIC was diluted in 3 times by using water to prepare an ink for forming resin layer. After film-forming a resin layer by applying the ink for forming rein layer on a glass substrate with a bar coater No. 10, a resin layer was formed by heating at 120° C. for 30 minutes. Next, the conductive ink A was applied with a bar coater (No. 7) on a blanket made of silicone, and the substrate with the resin layer was pressed to the blanket to transfer the conductive coating film to the substrate with the resin layer. Thereafter, a present conductive coated composite body 1 was obtained by sintering at 120° C. for 30 minutes.

Example 2

HYDRAN HW-312B available from DIC was diluted in 3 times by using ethanol to prepare an ink for forming resin layer. When observing with naked eyes, the HW-312B was completely dissolved. After film-forming by applying the ink for forming rein layer on a glass substrate with a spin coater under the conditions of 2000 rpm for 30 seconds, a resin layer was formed by heating at 120° C. for 30 minutes. Next, the conductive ink B was applied with a bar coater (No. 7) on a blanket made of silicone, and the substrate with the resin layer was pressed to the blanket to transfer the conductive coating film to the substrate with the resin layer. Thereafter, a present conductive coated composite body 2 was obtained by sintering at 120° C. for 30 minutes.

Example 3

HYDRAN HW-311 available from DIC was diluted in 3 times by using N-methyl-2-pyrrolidone to prepare an ink for forming resin layer. When observing with naked eyes, the HW-311 was completely dissolved. Thereafter, a present conductive coated composite body 3 was obtained in the same manner as in Example 2.

Example 4

After film-forming a resin layer by applying SUPER-FLEX 470 available from DKS Co., Ltd. with a bar coater No. 10, a resin layer was formed by heating at 120° C. for 30 minutes. Thereafter, a present conductive coated composite body 4 was obtained in the same manner as in Example 2.

Example 5

A present conductive coated composite body 5 was obtained in the same manner as in Example 2 except that the conductive ink C was used.

Example 6

A present conductive coated composite body 6 was obtained in the same manner as in Example 3 except that Epocros WS-700 available from NIPPON SHOKUBAI CO., LTD. was added to the ink for forming resin layer of Example 3 in an amount of 5% by weight with respect to the ink for forming resin layer.

Example 7

A present conductive coated composite body 7 was obtained in the same manner as in Example 2 except that the conductive ink D was used.

Comparative Example 1

A comparative conductive coated composite body 1 was obtained in the same manner as in Example 1 except that the ink for forming resin layer was not used.

Comparative Example 2

A comparative conductive coated composite body 2 was obtained in the same manner as in Example 4 except that SUPERFLEX 210 available from DKS Co., Ltd. was used.

Comparative Example 3

SUPERFLEX 420 available from DKS Co., Ltd. was diluted in 3 times by using water to prepare an ink for forming resin layer. After film-forming by applying the ink for forming rein layer on a glass substrate with a spin coater under the conditions of 2000 rpm for 30 seconds, a resin layer was formed by heating at 120° C. for 30 minutes. Next, a comparative conductive coated composite body 3 was obtained in the same manner as in Example 1 by using the conductive ink A.

Comparative Example 4

A comparative conductive coated composite body 4 was obtained in the same manner as in Comparative Example 2 except that the conductive ink C was used.

Comparative Example 5

A comparative conductive coated composite body 5 was obtained in the same manner as in Example 1 except that Aronmighty AS-60 available from TOAGOSEI CO., LTD. was used as the conductive ink.

Comparative Example 6

Eslec BL-S available from SWKISUI CHEMICAL CO., LTD. was dissolved in a solution of ethanol/toluene (=1/1 W/W) to prepare an ink for forming resin layer having a solid content of 10 wt %. Thereafter, a comparative conductive coated composite body 6 was obtained in the same manner as in Example 2.

Comparative Example 7

A comparative conductive coated composite body 7 was obtained in the same manner as in Example 2 except that SUPERFLEX 150HS available from DKS Co., Ltd. was diluted in 3 times by using water to prepare an ink for forming resin layer.

Comparative Example 8

A comparative conductive coated composite body 8 was obtained in the same manner as in Example 1 except that SUPERFLEX 500M available from DKS Co., Ltd. was diluted in 3 times by using water to prepare an ink for forming resin layer.

Comparative Example 9

A comparative conductive coated composite body 9 was obtained in the same manner as in Example 2 except that SUPERFLEX 650 available from DKS Co., Ltd. was diluted in twice by using water to prepare an ink for forming resin layer.

Comparative Example 10

A comparative conductive coated composite body 10 was obtained in the same manner as in Example 2 except that HYDRAN ADS-120 available from DIC was diluted in 3 times by using water to prepare an ink for forming resin layer.

[Evaluation Test]
(1) Evaluation of Adhesion Property

The test is conducted by adhering Cellotape (available from Nichiban Co., Ltd. 18 mm) to the conductive coated composite body obtained in Examples 1 to 5 and Comparative Examples 1 to 6, and peeling the tape at one stroke. The results are classified according to the following evaluation standard: a case where no peeled off part is observed with naked eyes is represented by ◎, a case where a slight part (2% or less) is peeled off is represented by ○, a case where a part of 10% or less is peeled off is represented by Δ, and a case where a part of 20% or more is peeled off is represented by x, and are shown in Table 3.

(2) Evaluation of Conductivity

The conductivity of the conductive coated composite body is calculated as a volume resistivity by measuring a surface resistivity by using Loresta GP MCP-T610 available from Mitsubishi Chemical Analytech Co., Ltd., and multiplying by a film thickness. A case where the volume resistivity is 15 μΩ·cm or less is represented by ○, and a case where the volume resistivity is more than 15 μΩ·cm is represented by x, and the results are shown in Table 3. A sample that the evaluation of adhesion property is represented by ○ or more and the evaluation of conductivity is represented by ○ is evaluated as ○ in total evaluation, and the results are shown in Table 3.

(3) Evaluation of Heat Resistance

The heat resistance of the conductive coated composite body obtained in Examples 1 to 5 is evaluated. A glass relief printing plate is pressed to a blanket where each conductive ink is applied to remove the non-image part (unnecessary part) by transferring printing. Further, patterns are transferred to a base with resin layer by pressing the base to the blanket. The patterns are thinning patterns having line widths of 10, 20, 30, 50, 100 μm, and a length of 10 mm. Further, the base is sintered 120° C. for 30 minutes to obtain a conductive coated composite body. Next, after subjecting the conductive coated composite body to the exposure test at a high temperature for a short time, i.e. 180° C. for 1 minute repeatedly 5 times, the shape of the pattern is observed by a microscope. A case where deformation such as curved part or breakage is observed is represented by x, and a case such deformation is not observed is represented by ○, and the results are shown in Table 3.

TABLE 3

|  | Example | | | | | | | Comparative Example | | | | | | | | | |
| --- | --- | --- | --- | --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 | 7 | 8 | 9 | 10 |
| Thickness of resin layer (μm) | 2 | 0.3 | 0.4 | 5 | 0.3 | 0.4 | 0.3 | — | 5 | 0.4 | 5 | 3 | 0.5 | 0.4 | 0.5 | 0.4 | 0.5 |
| Adhesion property | ◎ | ◎ | ◎ | ◎ | ○ | ◎ | ○ | X | X | ◎ | ○ | ◎ | ◎ | ○ | X | Δ | Δ |
| Conductivity (μΩ·cm) | 13 | 12 | 11 | 13 | 15 | 12 | 15 | 13 | 13 | 50 | 43 | 450 | 30 | 40 | 35 | 23 | 20 |
|  | ○ | ○ | ○ | ○ | ○ | ○ | ○ | ○ | ○ | X | X | X | X | X | X | X | X |
| Total evaluation | ○ | ○ | ○ | ○ | ○ | ○ | ○ | X | X | X | X | X | X | X | X | X | X |
| Heat resistance | X | ○ | ○ | X | ○ | ◎ | ○ | | | | | | | | | | |

It is confirmed that the present conductive coated composite bodies 1 to 5 have both the adhesion property and good conductivity. To the contrary, comparing the present conductive coated composite bodies 1 to 5 and the comparative conductive coated composite body 1, when the resin layer is not formed, good adhesion property cannot be obtained. Further, in the comparative conductive coated composite bodies 2 to 4 where the elongation at break of the resin layer is less than 600% and the comparative conductive coated composite bodies 5 and 6 where the polyurethane resin is not used, the adhesion property and the conductivity cannot be obtained at the same time. Further, in the comparative conductive coated composite bodies 8, 9 and 10 where the polyurethane resin which does not have the specific functional group is used, good adhesion property cannot be obtained.

Furthermore, as the results of the evaluation of heat resistance of the present conductive coated composite bodies 1 to 5, when the film thickness of the resin layer is 1 μm or less, it is possible to endow the conductive coated composite body with good heat resistance.

EXPLANATION OF SYMBOLS

1 Conductive coated composite body
2 Base
4 Resin layer
6 Conductive coating film

The invention claimed is:

1. A conductive coated composite body, which comprises:
a base,
a resin layer which is formed on at least a part of the base, and
a conductive coating film which is formed on at least a part of the resin layer,
wherein
the conductive coating film comprises a fine silver particle dispersion, the dispersion comprising fine silver particles, at least a portion of surfaces of the fine silver particles being coated with an amine coating consisting of short chain amines having 5 or less carbon atoms and a partition coefficient log P of −1.0 to 1.4, and a dispersant having an acid value for dispersing the fine silver particles, and
a polyurethane resin having an elongation at break of 600% or more constitutes a majority of the resin layer, and
the short chain amines comprise alkoxyamine.

2. The conductive coated composite body according to claim 1, wherein the polyurethane resin is obtained from an aqueous polyurethane resin.

3. The conductive coated composite body according to claim 1, wherein the resin layer is formed by applying an aqueous polyurethane resin which is dissolved in a solvent to the base.

4. The conductive coated composite body according to claim 1, wherein the resin layer has a thickness of 1 μm or less.

5. The conductive coated composite body according to claim 1, wherein the fine silver particle dispersion further comprises a protective dispersant having an acid value, and the acid value is 5 to 200.

6. The conductive coated composite body according to claim 5, wherein the protective dispersant has a functional group derived from a phosphoric acid.

7. The conductive coated composite body according to claim 1, wherein the polyurethane resin has at least one functional group selected from the group consisting of —COOH, —COOR, —COO—NH$^+$R$_2$, and —COO$^-$NH$_4^+$, with R and R$_2$ independently representing an alkyl group, a cycloalkyl group, an alkylene group, an oxyalkylene group, an aryl group, an arylalkyl group, a heterocyclic group, an alkoxy group, an alkoxycarbonyl group, or an acyl group, each of which may be linear or branched and each of which may be substituted or unsubstituted.

8. The conductive coated composite body according to claim 1,
wherein a total content of the short chain amine in the fine silver particle dispersion is controlled to be in the range of from 0.5 to 50% by mass, so that a weight loss of the fine silver particle dispersion when heated from room temperature to 200° C. is 20% by mass or less, and
wherein a total content of the dispersant having an acid value in the fine silver particle dispersion is controlled to be in the range of from 0.1 to 15% by mass, so that a weight loss of the fine silver particle dispersion when heated from 200° C. to 500° C. is 10% by mass or less.

9. A method for producing a conductive coated composite body, which comprises:
forming a resin layer by applying an aqueous polyurethane resin which is dissolved in a solvent to at least a part of a base,
applying a fine silver particle dispersion to at least a part of the resin layer, and
forming a conductive coating film by sintering the fine silver particles contained in the fine silver particle dispersion by external heating,
wherein the polyurethane resin constitutes a majority of the resin layer, and
wherein the fine silver particle dispersion is obtained by:
providing a mixture comprising a silver compound, a short chain amine having 5 or less carbon atoms in an amount of 2 mol or more for each 1 mol of metal silver in the silver compound, and a dispersant having an acid value of from 5 to 200,
reducing the mixture with a reducing agent to obtain fine silver particles having the short chain amine adsorbed on surfaces of the fine silver particles, and then
dispersing the fine silver particles in a dispersing medium.

10. The method for producing a conductive coated composite body according to claim 9,
wherein the dispersing medium comprises a highly polar solvent, and
wherein a partition coefficient log P of the short chain amine is −1.0 to 1.4.

11. The method according to claim 9, wherein the polyurethane resin has an elongation at break of 600% or more.

* * * * *